July 1, 1952

N. E. ANDERSON 2,602,124

LIMIT-SWITCH MECHANISM

Filed July 1, 1950

INVENTOR
NELSON E. ANDERSON
BY
ATTORNEYS

July 1, 1952     N. E. ANDERSON     2,602,124
LIMIT-SWITCH MECHANISM
Filed July 1, 1950                      3 Sheets-Sheet 3
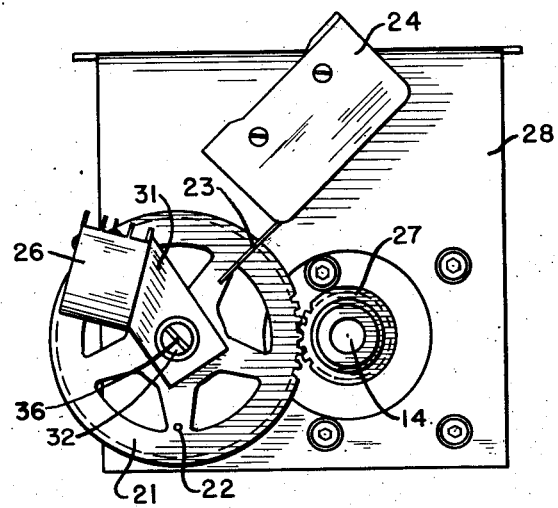
FIG. 3
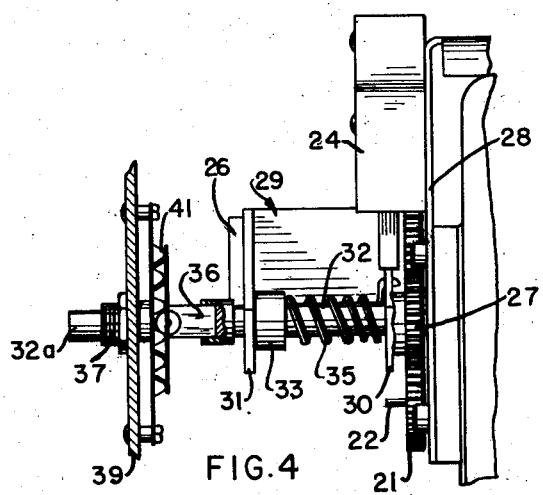
FIG. 4
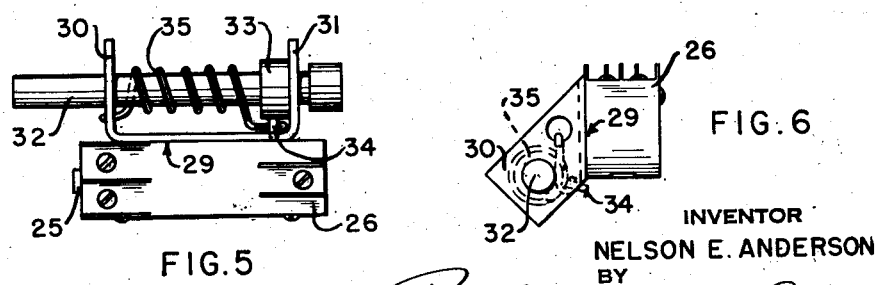
FIG. 5                      FIG. 6
INVENTOR
NELSON E. ANDERSON
BY
ATTORNEYS Patented July 1, 1952

2,602,124

UNITED STATES PATENT OFFICE 2,602,124

LIMIT-SWITCH MECHANISM

Nelson E. Anderson, Berkeley Heights, N. J., assignor to Air Reduction Company, Incorporated, New York, N. Y., a corporation of New York Application July 1, 1950, Serial No. 171,625

5 Claims. (Cl. 200—47)

This invention relates to limit switches of the kind used on electrical apparatus for limiting the movement of some part that is moved by an electric motor. More particularly, the invention relates to an adjustable limit switch and improved manually operable means for adjusting it.

In electrical apparatus in which some part is motor-driven in one direction and then in the opposite direction and in which a limit switch is employed to arrest the movement of the part after it has traveled the desired distance in one direction, it is frequently desirable to mount the limit switch so that its position may be adjusted to vary the point in the travel of the motor-driven part at which the limit switch will be actuated to arrest its motion. Ordinarily the position of such a limit switch could not be adjusted to cause a shorter movement of the motor-driven part if the motor-driven part happens to be in the position it assumes when its motion has just been arrested by the limit switch because then the limit switch is held against movement in the direction in which it should be adjusted to effect a shorter movement of the motor-driven part.

The principal object of this invention is to provide an adjustable limit switch and manually operable means for adjusting it such that even if the motor-driven part happens to be in the position just mentioned, the manually operable means for adjusting the limit switch may be preset and this will cause the limit switch, as soon as it is free to do so during the return movement of the motor-driven part, to assume an adjusted position such that it will then arrest the movement of the motor-driven part at the desired new point in its travel.

My improved limit switch mechanism was designed primarily for use in connection with electric welding apparatus of the type by which so-called mechanical welding can be performed, and the invention will be described in its application to that particular type of electrical apparatus, but it should be understood that it may be used in electrical apparatus of other kinds.

Electric welding apparatus of the kind for which the improved limit switch mechanism was especially designed has an electrode holder that is motor driven toward and away from the work, and a pair of limit switches which prevent the electrode holder from being raised or lowered beyond certain extreme limits usually determined by the mating range of the usual rack on the electrode holder and the motor-driven pinion which engages with it. Experience has shown that in welding apparatus of this kind only one limit for the motor-produced upward movement of the electrode holder is insufficient for practical purposes because under many working conditions it is not necessary for the electrode holder to be raised to the extreme limit of its upward travel between welds. It is not always convenient to manually operate a switch to stop the upward movement of the electrode holder when it has reached the desired elevation short of the extreme limit of its upward movement especially when its retracting action or upward movement takes place automatically when the welding current is shut off. To allow the electrode holder to be raised by its motor to the extreme limit of its upward movement and then subsequently lower it to the desired level is time consuming and a roundabout way of accomplishing the desired result.

According to the invention, when applied to electric welding apparatus of the kind above referred to, the upper limit switch is mounted so that its position may be adjusted to vary the point in the upward travel of the electrode holder at which the limit switch will be actuated to arrest the electrode holder's upward movement, and manually operable adjusting means is connected to the limit switch in such a way that even if the parts are in the position they assume when the upper limit switch has just been actuated to arrest the upward movement of the electrode holder (and the limit switch is therefore held against movement in a direction which would bring about a shorter upward movement of the electrode holder) the manually operable adjusting means can, nevertheless, be preset to cause the upper limit switch to assume some new adjusted position (determined by the setting of the manual adjusting means) as soon as the electrode holder is lowered and thereby renders the upper limit switch movable in the desired direction. Thus, the manually operable adjusting means may be set to bring about the desired adjustment of the upper limit switch regardless of the position of the electrode holder at the time the adjusting means is manually set.

The accompanying drawings illustrate the invention as applied to electric welding apparatus for use in mechanical welding. In the drawings:

Fig. 3 is a right end view of the parts which appear to the left of the line 3—3 of Fig. 2 when in assembled condition;

Fig. 4 is a side elevation, partly in vertical section, of the parts shown in Fig. 2 as they appear when viewed from the rear and when in assembled condition; and Figs. 5 and 6 are a plan view and a left end view respectively of the upper limit switch and the parts which appear in association with it in Fig. 2.

Figure 1:
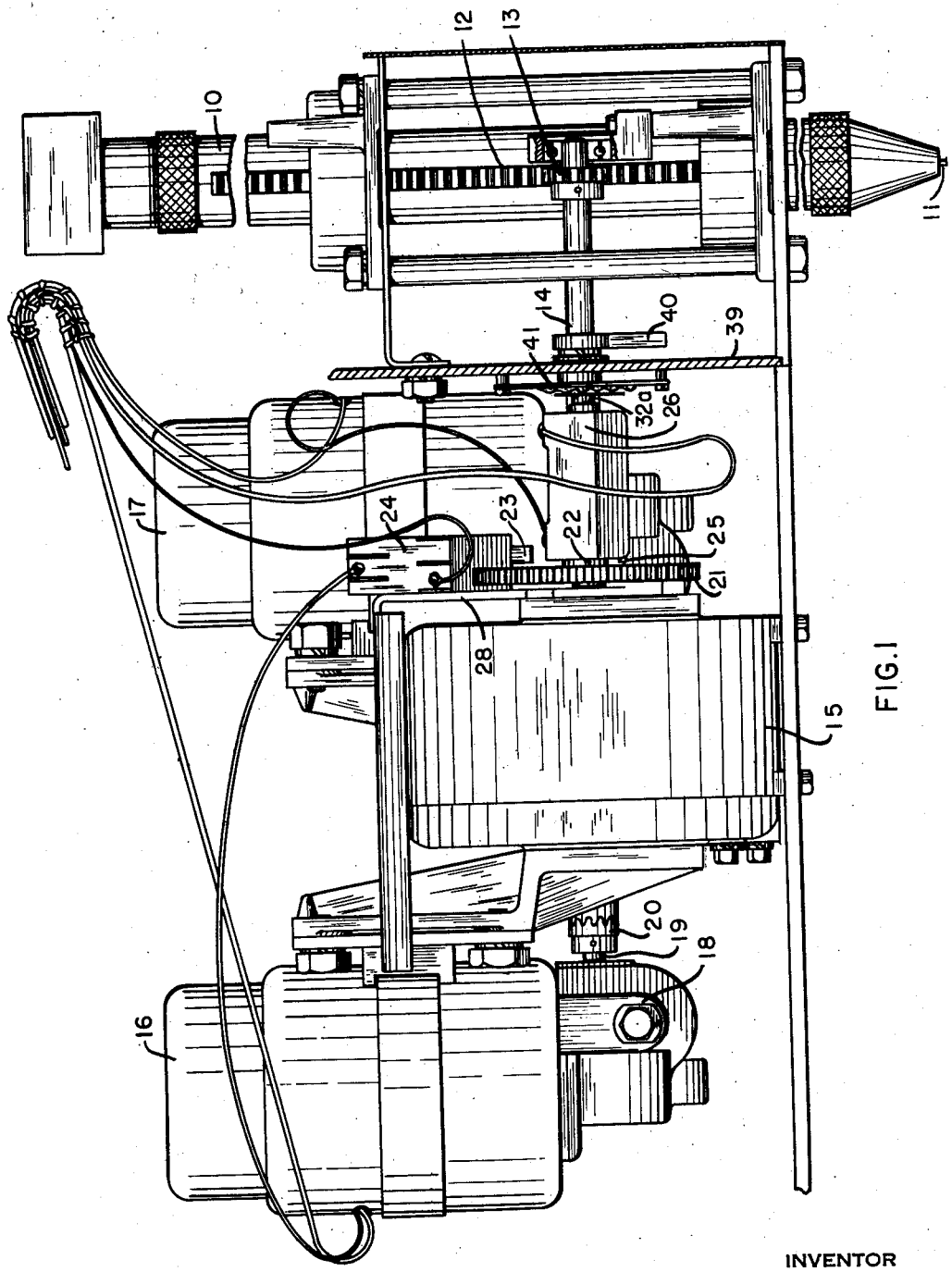
Figure 1 is an end elevation of welding apparatus equipped with limit switch mechanism of the kind contemplated by the invention.

Referring first to Fig. 1, the welding apparatus shown therein includes an electrode holder or welding torch shown at 10 within which is mounted an electrode 11. The details of the electrode holder are not important so far as the present invention is concerned, it being sufficient to note that a vertically disposed rack 12 is mounted on the electrode holder which meshes with an actuating pinion 13 on the end of a shaft 14. It is evident from this arrangement that the electrode holder may be adjusted toward or away from the work by rotation of the shaft 14 in one direction or the other.

The shaft 14 is motor driven and in the particular welding apparatus illustrated in Fig. 1 is driven by the output of a differential 15 which combines the outputs of two electric motors designated 16 and 17. A gear reduction unit 18, shaft 19, and coupling 20, connect the motor 16 with the differential 15, and similar mechanism connects motor 17 with the differential.

The motor mechanism above described for rotating the shaft 14 and raising and lowering the electrode holder may be similar to, and operate on the same principle as, the motors shown in my Patent No. 2,461,798, issued February 15, 1949, for automatically adjusting the position of the electrode holder in accordance with the arc voltage. In addition, the motor 17 may be operated while the motor 16 is at rest to raise the electrode holder 10, and the motor 16 may be operated while the motor 17 is at rest to lower the electrode holder, this being accomplished by suitable switches not shown. Thus, the motors may be considered as any motor-means, either a single motor or two motors, for rotating the shaft 14 in the proper direction to raise or lower the electrode holder 10.

An idler gear 21 is driven by a pinion mounted on the shaft 14. This pinion does not show in Fig. 1 because it is located in back of the gear 21 but it appears in some of the other figures. The idler gear 21 carries a pin 22 which engages the contact arm 23 of a lower limit switch 24, or the contact arm 25 of an upper limit switch 26. When the contact arm 23 of the lower limit switch is moved by the pin 22 the downward movement of the electrode holder 10 is arrested, and when the contact arm 25 of the upper limit switch is moved by the pin 22 the upward movement of the electrode holder is arrested. Ordinarily, the limit switches prevent the electrode holder from being moved either up or down beyond the mating range of the rack 12 and the pinion 13.

As above stated it is desirable to make at least the upper limit switch adjustable so that when the electrode holder is being motor driven away from the work, i. e., when it is being raised, it will stop at some desired elevation short of its extreme limit of upward movement determined by the mating range of the rack and pinion 12—13 and by the normal position of the upper limit switch. The mechanism for accomplishing this is best shown in Figs. 2-6, inclusive.

Figure 2:
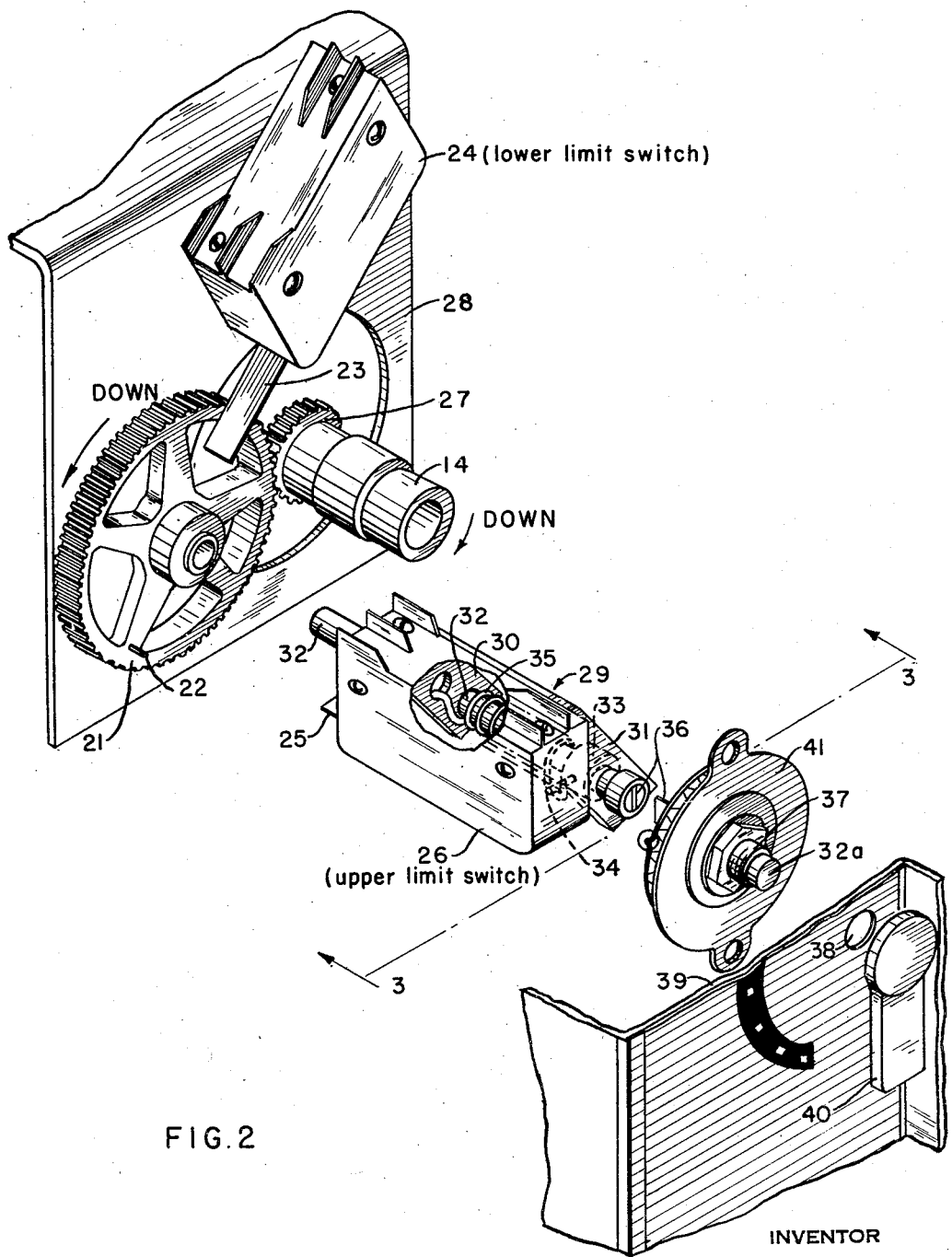
Fig. 2 is an exploded perspective view of a portion of the apparatus shown in Fig. 1 showing the upper and lower limit switches, their actuating mechanism, and the manually operable adjusting means for the upper limit switch.

The idler gear 21 with its pin 22 that constitutes the actuating element for the limit switches and the lower and upper limit switches 24 and 26, respectively, with their contact arms 23 and 25, are more clearly shown in Fig. 2, which is an exploded perspective view of a part of the mechanism illustrated in Fig. 1. Fig. 2 also clearly shows at 27 the above-mentioned pinion on the shaft 14 which drives the idler gear 21.

Referring further to Fig. 2, the lower limit switch 24 is secured to a fixed part 28 of the machine but the upper limit switch 26 is carried by a bracket 29. The arms 30 and 31 of which are mounted on an adjusting shaft 32 so that these arms and the limit switch itself may be moved about the axis of the adjusting shaft. When the parts shown in Fig. 2 are in assembled relation the idler gear 21 rotates freely on the adjusting shaft 32 and the pin 22 moves in an arcuate path. The contact arm 25 of the upper limit switch 26 lies in the path of movement of the pin 22 so that when the electrode holder is being raised the pin 22, now rotating in a clockwise direction as viewed in Fig. 2, will eventually contact with the under surface of the contact arm 25 and move this arm to open the upper limit switch and thereby arrest the upward movement of the electrode holder. In Fig. 2 the pin 22 is shown in about the position it assumes when it contacts with the contact arm 25 of the upper limit switch. Similarly the contact arm 23 of the lower limit switch 24 lies in the path of movement of the pin 22 so that when the electrode holder is being lowered and the pin 22 is moving in a counterclockwise direction, as viewed in Fig. 2, the pin will engage this contact arm to move it and operate the limit switch 24 and thereby arrest the downward movement of the electrode holder.

A collar 33 is fixed to the adjusting shaft 32 between the arms 30 and 31 of the limit switch bracket 29. A pin 34 extends radially from this collar as best shown in Fig. 5. A coil spring 35 is mounted on the adjusting shaft 32 between the bracket arms 30 and 31 in coaxial relation with the adjusting shaft. One end of this spring is hooked over the pin 34 (Figs. 5 and 6) and the other end is attached to the bracket arm 30. The spring is wound up enough when the parts are assembled to bias the upper limit switch 26 in a counterclockwise direction on the adjusting shaft 32 and maintain a part of the bracket 29 in contact with the pin 34 on the collar 33. Thus, the pin 34 acts as a stop which is engaged by a part on the limit switch to normally maintain the upper limit switch in a normal position relative to the adjusting shaft 32.

The adjusting shaft 32 is in axial alignment with a shaft section 32a (Fig. 2) which is keyed to the adjusting shaft by means of a key and keyway shown at 36. The outer end of the shaft section 32a turns in a bearing member 37 which is mounted in an opening 38 in a fixed part 39 of the welding apparatus (see also Fig. 4). The adjusting shaft 32 and the shaft section 32a therefore constitute in effect a single adjusting shaft the outer end of which is rotatively supported in the fixed part 39 of the welding apparatus and the other end of which is rotatively supported in the fixed part 28 of the welding apparatus. The end of the shaft section 32a has a handle 40 secured to it. This handle also appears in Fig. 1. A detent mechanism 41 associated with the shaft section 32a yieldingly holds the adjusting shaft in any one of a number of positions to which it may be turned by the handle 40.

It will now be seen that if the adjusting shaft 32—32a is turned in a clockwise direction by the handle 40 the pin 34 carried by the actuating shaft, being in engagement with the bracket 29, will move the limit switch 26 bodily about the axis of the adjusting shaft in a clockwise direction. This will increase the elevation at which the movement of the electrode holder will be arrested during its upward movement because the pin 22 will then contact with the contact arm 25 of the upper limit switch later in the upward movement of the electrode holder. Whenever the upper limit switch 26 is free to move in a counterclockwise direction about the axis of the adjusting shaft 32—32a, as when the pin 22 is not in contact with the under surface of the contact arm 25, turning of the adjusting shaft 32—32a in a counterclockwise direction by the handle 40 will also cause the limit switch 26 to move in a counterclockwise direction about the axis of the adjusting shaft because the bracket 29 of the upper limit switch is yieldingly retained in contact with the pin 34 by means of the coil spring 35. This adjustment will cause the pin 22 to come in contact with the under surface of the contact arm 25 of the upper limit switch earlier during the upward movement of the electrode holder and thereby arrest its movement at a lower elevation. If the electrode holder happens to be in a position in which the pin 22 is in engagement with the under surface of the contact arm 25 of the upper limit switch then this limit switch cannot be moved in a counterclockwise direction about the axis of the adjusting shaft, but the pin 34, and the part of the upper limit switch with which it cooperates, constitute a one-way coupling so that, even under these circumstances, the adjusting shaft can be turned by the handle 40 in a counterclockwise direction to some desired position while the limit switch 26 remains stationary, and then when this limit switch is free to do so, i. e., during the first part of the downward movement of the electrode holder, the limit switch will be moved by the coil spring 35 (now wound even tighter by the turning of the adjusting shaft while the limit switch remains stationary) in a counterclockwise direction until the bracket 29 again contacts with the pin 34. Thus, if it is desired to adjust the upper limit switch 26 in a counterclockwise direction about the axis of the adjusting shaft when the pin 22 holds this limit switch against such counterclockwise movement, the adjusting shaft can be turned in a counterclockwise direction and preset at some position corresponding to the desired adjustment of the limit switch. Then when the limit switch is free to do so it will move to the desired adjusted position depending upon the presetting of the adjusting shaft.

The adjusting shaft can therefore be turned at any time to effect the desired adjustment of the position of the upper limit switch regardless of the position in which the electrode holder happens to be at the time.

The invention is applicable to any limit switch, whether it be an upper limit switch or a lower limit switch, and if desired, each one of a plurality of limit switches may have adjusting means of the kind described. The above-described welding apparatus with its movable electrode holder is merely an example of the kind of apparatus in connection with which the invention may be used, and it should be understood that the motor-driven part whose movement is controlled by the limit switches may be a part of any kind and may move in any kind of a path whether it be a vertical path of the kind in which the above-described electrode holder moves or a path of some other kind.

I claim:

1. Limit-switch mechanism for limiting the movement of a motor-driven part comprising a limit switch mounted so that its position may be adjusted, an actuating element for the limit switch which moves in accordance with the movement of the motor-driven part, the limit switch having an arm located in the path of travel of said actuating element and adapted when moved thereby to operate the limit switch, and manually operable means for adjusting the position of the limit switch comprising an adjusting member movable in opposite directions, a one-way coupling between said member and the limit switch comprising a stop portion on the adjusting member normally engaging a stop portion on the limit switch, and a spring interposed between a part on the limit switch and a part on said adjusting member and biasing the limit switch to a normal position relative to the adjusting member in which said stop portions are in engagement, said stop portions being so arranged that when the limit switch is held against movement in one direction by the actuating element, and the adjusting member is moved to a selected position in a direction that will move its stop portion in the direction in which the limit switch cannot move, the stop portion on the adjusting member will move away from the one on the limit switch and the spring will then function when the limit switch is free to move it to said normal position in which the stop portions are again in engagement but when the adjusting member is moved in the opposite direction the stop portions will remain in engagement and the movement of the adjusting member will be positively transmitted to the limit switch through the one-way coupling.

2. Limit-switch mechanism for limiting the movement of a motor-driven part comprising a limit switch mounted so that it is bodily adjustable in position, an actuating element for the limit switch which moves in accordance with the movement of the motor-driven part, the limit switch having an arm located in the path of travel of said actuating element and adapted when moved thereby to operate the limit switch, means for adjusting the position of the limit switch comprising an adjusting member movable in opposite directions, a one-way coupling between said member and the limit switch comprising a stop carried by said adjusting member normally engaging a part on the limit switch, a spring biasing the limit switch to a normal position relative to the adjusting member in which said part on the limit switch is in engagement with said stop on the adjusting member, and manually operable means for moving said adjusting member, said stop on the adjusting member and the engaging part on the limit switch being so arranged that when the limit switch is held against movement in one direction by the actuating element, and the adjusting member is moved to a selected position in a direction that will move its stop in the direction in which the limit switch cannot move, the stop on the adjusting member will move away from the engaging part on the limit switch and the spring will then function when the limit switch is free to move to move it to said normal position in which the stop on the adjusting member is again in engagement with said part on the limit switch but when the adjusting member is moved in the opposite direction the stop on the adjusting member and said part on the limit switch will remain in engagement and the movement of the adjusting member will be positively transmitted to the limit switch through the one-way coupling.

3. Limit-switch mechanism for limiting the movement of a motor-driven part comprising a limit switch, a movable shaft, means mounting the limit switch on said shaft for limited bodily movement relative to the shaft, an actuating element for the limit switch which moves in accordance with the movement of the motor-driven part, the limit switch having an arm located in the path of travel of said actuating element and adapted when moved thereby to operate the limit switch, a one-way coupling between said shaft and the limit switch comprising a stop carried by the shaft normally engaging a part on the limit switch, a spring biasing the limit switch to a normal position relative to said shaft in which said part on the limit switch is in engagement with said stop on the shaft, and manually operable means for moving the shaft, said stop on the shaft and the engaging part on the limit switch being so arranged that when the limit switch is held against movement in one direction by the actuating element, and the shaft is moved to a selected position in a direction that will move its stop in the direction in which the limit switch cannot move, the stop on the shaft will move away from the engaging part on the limit switch and the spring will then function when the limit switch is free to move to move it to said normal position in which the stop on the shaft is again in engagement with said part on the limit switch but when the shaft is moved in the opposite direction the stop on the shaft and said part on the limit switch will remain in engagement and the movement of the shaft will be positively transmitted to the limit switch through the one-way coupling.

4. Limit-switch mechanism for limiting the movement of a motor-driven part comprising an adjustable limit switch, a rotatable adjusting shaft, means mounting the limit switch on said shaft for limited bodily movement relative to the shaft and about the axis thereof, an actuating element for the limit switch which moves in accordance with the movement of the motor-driven part, the limit switch having an arm located to one side of said shaft in the path of travel of said actuating element and adapted when moved by said element to operate the limit switch, a one-way coupling between said shaft and the limit switch comprising a stop carried by the shaft normally engaging a part on the limit switch, a coil spring coaxially mounted on the shaft and biasing the limit switch to a normal position relative to the shaft in which said part on the limit switch is in engagement with the stop on the shaft, and manually operable means for rotating said shaft, said stop on the shaft and the engaging part on the limit switch being so arranged that when the limit switch is held against movement in one direction by the actuating element, and the shaft is rotated to a selected position in a direction that will move its stop in the direction in which the limit switch cannot move, the stop on the shaft will move away from the engaging part on the limit switch and the spring will then function when the limit switch is free to move to move it to said normal position in which the stop on the shaft is again in engagement with said part on the limit switch but when the shaft is rotated in the opposite direction the stop on the shaft and said part on the limit switch will remain in engagement and the rotation of the shaft will be positively transmitted to the limit switch through the one-way coupling.

5. Limit-switch mechanism for limiting the movement of a motor-driven part comprising an adjustable limit switch, a rotatable adjusting shaft, means mounting the limit switch on said shaft for limited bodily movement relative to the shaft and about the axis thereof, an actuating element for the limit switch, means for moving said actuating element in co-relation with the movement of the motor-driven part and in an arcuate path concentric with said rotatable adjusting shaft, the limit switch having an arm located to one side of said shaft in the path of travel of said actuating element and adapted when moved by said element to operate the limit switch, a one-way coupling between said shaft and the limit switch comprising a stop carried by the shaft normally engaging a part on the limit switch, a coil spring coaxially mounted on the shaft and biasing the limit switch to a normal position relative to the shaft in which said part on the limit switch is in engagement with the stop on the shaft, and manually operable means for rotating said shaft, said stop on the shaft and the engaging part on the limit switch being so arranged that when the limit switch is held against movement in one direction by the actuating element, and the shaft is rotated to a selected position in a direction that will move its stop in the direction in which the limit switch cannot move, the stop on the shaft will move away from the engaging part on the limit switch and the spring will then function when the limit switch is free to move to move it to said normal position in which the stop on the shaft is again in engagement with said part on the limit switch but when the shaft is rotated in the opposite direction the stop on the shaft and said part on the limit switch will remain in engagement and the rotation of the shaft will be positively transmitted to the limit switch through the one-way coupling.

NELSON E. ANDERSON.

REFERENCES CITED

The following references are of record in the file of this patent:

UNITED STATES PATENTS

| Number | Name | Date |
|---|---|---|
| 1,760,145 | Kent | May 27, 1930 |
| 2,338,365 | Thorp et al. | Jan. 4, 1944 |
| 2,474,945 | Johnson | July 5, 1949 |